April 21, 1959
D. LABINO
2,883,296
GLASS COMPOSITION
Filed Nov. 23, 1953
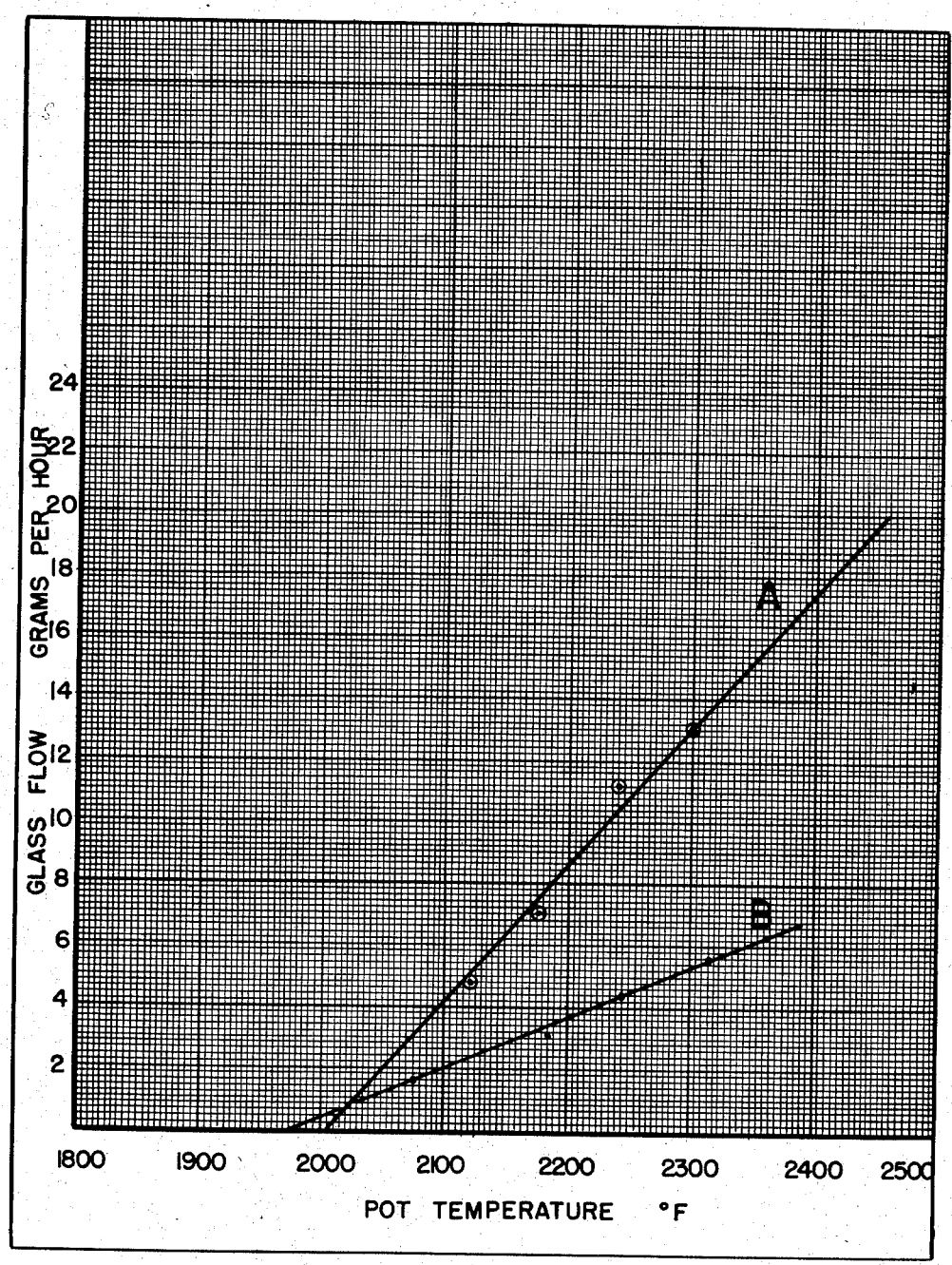
INVENTOR.
DOMINICK LABINO
BY Toulmin & Toulmin
ATTORNEYS

2,883,296
GLASS COMPOSITION
Dominick Labino, Toledo, Ohio, assignor, by mesne assignments, to L.O.F Glass Fibers Company, Toledo, Ohio, a corporation of Ohio
Application November 23, 1953, Serial No. 393,798
4 Claims. (Cl. 106—50)

This invention relates to a glass composition which is particularly useful in the production of glass fibers and which glass has characteristics which render it very suitable for electrical insulation as well as plastic reinforcement purposes.

It is a primary object of this invention to provide a glass composition which in the molten state exhibits a relatively low change in viscosity per degree of temperature change; thus the glass flow from a pot of the molten material changes less per degree of temperature difference than with similar compositions adapted for fiberizing and particularly the flow change is less than with fiberizing compositions such as "E" glass where electrical characteristics of the glass fibers are of importance.

It is a principal object of this invention to describe a glass composition which gives up its gaseous constituents readily and accordingly does not foam or re-boil in the melting pot as is usual with many fiberizing glasses.

It is a further object of this invention to describe a glass composition which has a lower liquidus temperature than the glasses customarily used for the production of fibers for electrical insulation purposes.

It is a particular object of this invention to provide a glass composition which has characteristics such that it becomes possible to operate a glass melting pot for the production of fibers at a lower temperature than is customarily employed which results not only in the saving of fuel and equipment costs but permits the use of larger nipple openings in the pot due to the greater glass viscosity at the lower temperature; the viscosity is closely controllable and larger fibers of great length may be formed without danger of excessive filament breakage.

It is another object of the invention to describe a glass composition which may be formed with relatively cheaper and larger strands than is normally employed in the fiberizing glasses used for electrical insulation purposes.

It is yet another object of this invention to describe a glass composition which exhibits a high acid resistance a feature which is of particular importance in very small diameter fibers.

It is also an object of this invention to describe a glass composition which may be rendered molten for drawing into fine fibers of uniform diameter either by induction or gaseous heating.

It is an important object of this invention to provide glass fibers of a glass composition which is such that it renders the fibers more durable with respect to water than the usual fibers employed for electrical insulation and plastic reinforcement purposes.

Other objects and advantages of the invention will become more apparent during the course of the following description when taken in connection with the accompanying drawing.

The foregoing objects are attained by a glass having a low devitrification rate, a relatively high viscosity at a relatively low, easily attainable liquidus temperature, a high melting rate and a relatively wide operating range—that is a substantially flat viscosity curve; such a composition comprises basically the following ingredients in weight percent:

| | |
|---|---|
| $SiO_2$ | 62–68 |
| $B_2O_3$ | 8–12 |
| CaO | 7–14 |
| Alkali ($Na_2O$ and $K_2O$) | 3–8 |
| $Al_2O_3$ | 3–7 |

With respect to the allowable range of the various components it is to be noted that increasing the silica will increase the glass viscosity at a given temperature making the glass more difficult to work; decreasing the silica below the stated range will result in a decrease in durability particularly with respect to water and acid resistance.

Increasing the $B_2O_3$ which is added to the original mix as $H_3BO_3$ decreases the resistance of the glass to attack by water and acid and gives rise to difficulties in the pot due to the volatility of this constituent; decreasing the $B_2O_3$ content decreases the resistance to weathering, renders melting of the glass more difficult, and causes devitrification at temperatures close to the attenuating temperature.

The lime (CaO) improves the stability and durability of the glass and functions as a flux; however increasing the lime tends to decrease the acid resistance of the glass and tends to also increase the speed and lower the temperature of devitrification as to the calcium bearing compounds; decreasing the lime tends to result in silica devitrification and it may be noted in this connection that too low a silica content relatively will also result in calcium bearing compounds devitrifying.

The alkali, $Na_2O$ or $K_2O$ or a mixture of the two, functions to reduce the viscosity at a given temperature, as well as to lower the founding temperature; at a ratio of about 2½ parts of $K_2O$ to one of $Na_2O$ the electrical characteristics of the glass are superior. However increasing the alkali results in a loss of durability and increasing susceptibility to attack by acid and water, while lowering the alkali below the stated range increases the viscosity.

The alumina ($Al_2O_3$) functions to improve the stability and devitrification tendency of the glass but amounts above the stated range in the present glass decrease the acid resistance and increase the liquidus temperature undesirably. $Fe_2O_3$ or other trivalent oxides such as antimony oxide may be partially substituted for the aluminum oxide, but the total of this $R_2O_3$ constituent should not exceed the noted 7 percent.

Fluorine which may suitably be added to the batch as cryolite (sodium aluminum fluoride) or fluorspar ($CaF_2$) tends to lower the viscosity of the glass and to increase the melting rate, but when used in larger amounts than about 2 percent it gives rise to excessive volatility in the batch.

The use of boric oxide and alkali in combination in the noted ranges apparently permits the utilization of silica in quantities which would otherwise render the glass excessively viscous for formation into fibers; thus it is preferred when using silica at the high end of the stated range to employ the boric oxide and alkaline oxides at the upper end of the stated ranges.

In specific application the following preferred glass composition has been found to be most satisfactory and has the characteristics noted hereinbefore:

| | Percent |
|---|---|
| $SiO_2$ | 66.4 |
| $B_2O_3$ | 11.1 |
| CaO | 12.1 |
| $Na_2O$ and $K_2O$ ($K_2O:Na_2O=2.4:1$) | 5.9 |
| $Al_2O_3$ | 4.4 |
| $F_2$ | 0.1 |
| | 100.0 |

The operating melting temperature of this glass for glass filament drawing is relatively low, about 2650° F., and the operating range is relatively wide about 350°–400° F. The temperature of the tips of the pot or crucible through which the glass is drawn may suitably be about 2000°–2400° F.—a much wider range than "E" glass will tolerate in the drawing of filaments.

In the attached drawing there is shown a chart which illustrates the glass flow in grams per hour from a pot at varying temperatures and compares the above specific glass composition (curve B) with that of standard "E" glass (curve A).

The standard or representative "E" glass had the following composition:

| | Percent |
|---|---|
| Silicon dioxide (SiO$_2$) | 53.78 |
| Iron and aluminum oxide (R$_2$O$_3$) | 14.50 |
| Calcium oxide (CaO) | 15.68 |
| Barium oxide (BaO) | 0.37 |
| Magnesium oxide (MgO) | 4.88 |
| Sodium oxide (Na$_2$O) | 0.43 |
| Potassium oxide (K$_2$O) | 0.05 |
| Boric oxide (B$_2$O$_3$) | 10.31 |
| | 100.00 |

It will be noted that curve "B" which illustrates the glass of invention is much flatten than that of curve "A" and accordingly over a wide operating temperature range the flow of glass will be much more nearly constant in the composition of invention than with that of the standard "E." In fact it has been found that the glass of the present invention, if subjected to a 50° variation, will result in only a length variation of about one thousand yards per pound of glass; while under similar conditions of operation a variation in temperature of about 10° with standard "E" glass will result in a yardage differential of three to four thousand yards per pound of glass drawn. Not only are losses minimized due to the viscosity-temperature characteristics of the new glass but production of fiber may be accomplished at a high rate; further this glass is particularly useful due to its lower liquidus temperature (about 1950° F.–1975° F.) in crucibles or pots of fire-clay material such as is described in my co-pending application, Serial No. 387,260, filed October 20, 1953, and assigned to the same assignee as the present invention.

The glass composition of invention which has been specifically set forth above, as contrasted with the mentioned "E" glass, has improved water resistance and acid resistance which are superior to the "E" glass. Thus upon boiling in distilled water for one hour the glass of invention lost only 2.07% in weight while upon boiling in hydrochloric acid solution (ratio one part by weight of acid to 9 of water) for the same length of time the loss was only 2.62%. In contrast thereto the "E" glass upon boiling in acid of the same concentration for the same length of time lost 23.7% in weight. The diameter of the fibers subjected to these tests was in each case about 0.48 micron.

This improved resistance to attack by water and acid is important in connection with the electrical characteristics of the fiber for many small fibers having diameters in the micron and submicron range tend to leach alkali in the presence of moisture—this provides a conductive film on the fiber and is destructive of the fiber for electrical insulation purposes; if the concentration of alkali increases unduly the fibers themselves may be destroyed. This same moisture and leaching effect of alkali tends to destroy bondings between the fiber and plastic materials under service conditions; it is accordingly surprising that the glass of invention which contains a moderate amount of alkali is superior to the "E" glass fiber wherein the alkali is materially limited—and superior with respect to the direct leachability of the constituents as well as under service conditions of the fiber.

The glass of invention is particularly suitable for use for blowing with a hot gaseous blast fine filaments of the glass into very small diameter fibers; the wide useful operating range of the glass and the ability thereof to melt and fine readily materially contribute to the efficiency of the glass in this hot gaseous blast operation. The fibers thus produced are highly uniform, suitable for self-adherence and formation into paper as described in my co-pending application, Serial No. 247,010, filed September 17, 1951, now abandoned, and assigned to the same assignee as the present invention.

It will be understood that this invention is susceptible to modification in order to adopt it to different usages and conditions and accordingly it is desired to comprehend such modifications within this invention as may fall within the scope of the appended claims.

I claim:

1. A glass composition consisting by weight of:

| | Percent |
|---|---|
| SiO$_2$ | 66.4 |
| B$_2$O$_3$ | 11.1 |
| CaO | 12.1 |
| Alkali oxide | 5.9 |
| Al$_2$O$_3$ | 4.4 |
| F$_2$ | 0.1 |

2. A glass composition consisting by weight of:

| | Percent |
|---|---|
| SiO$_2$ | 66.4 |
| B$_2$O$_3$ | 11.1 |
| CaO | 12.1 |
| Na$_2$O and K$_2$O | 5.9 |
| Al$_2$O$_3$ | 4.4 |
| F$_2$ | 0.1 |

3. Glass in the form of fibers consisting essentially of the following ingredients in the indicated approximate percentages by weight:

| | Percent |
|---|---|
| SiO$_2$ | 66.4 |
| B$_2$O$_3$ | 11.1 |
| CaO | 12.1 |
| Alkali metal oxide | 5.9 |
| Al$_2$O$_3$ | 4.4 |
| F$_2$ | 0.1 |

4. Glass in the form of fibers consisting essentially of the following ingredients in the indicated approximate percentages by weight:

| | Percent |
|---|---|
| SiO$_2$ | 66.4 |
| B$_2$O$_3$ | 11.1 |
| CaO | 12.1 |
| Na$_2$O and K$_2$O | 5.9 |
| Al$_2$O$_3$ | 4.4 |
| F$_2$ | 0.1 |

References Cited in the file of this patent

UNITED STATES PATENTS

| 1,365,797 | Smith | Jan. 18, 1921 |
| 2,308,857 | Bowes | Jan. 19, 1943 |
| 2,457,777 | Holtschulte et al. | Dec. 28, 1948 |

FOREIGN PATENTS

| 512,875 | Great Britain | Sept. 27, 1939 |